United States Patent
Ogilvie

(10) Patent No.: US 10,416,325 B2
(45) Date of Patent: Sep. 17, 2019

(54) PRESSURE TOLERANT SEISMIC SOURCE

(71) Applicant: Fugro N.V., Leidschendam (NL)

(72) Inventor: Angus James Stephen Ogilvie, Aberdeen (GB)

(73) Assignee: Fugro N.V. (NL)

( * ) Notice: Subject to any disclaimer, the term of this patent is extended or adjusted under 35 U.S.C. 154(b) by 595 days.

(21) Appl. No.: 14/964,182

(22) Filed: Dec. 9, 2015

(65) Prior Publication Data

US 2016/0170050 A1    Jun. 16, 2016

(30) Foreign Application Priority Data

Dec. 12, 2014 (NL) ...................................... 2013968

(51) Int. Cl.
 *G01V 1/137* (2006.01)
 *G01V 1/02* (2006.01)

(52) U.S. Cl.
 CPC ............... *G01V 1/137* (2013.01); *G01V 1/02* (2013.01); *Y02A 90/36* (2018.01)

(58) Field of Classification Search
 CPC ................................. G01V 1/02; G01V 1/137
 USPC ......................................................... 367/144
 See application file for complete search history.

(56) References Cited

U.S. PATENT DOCUMENTS

| | | | | |
|---|---|---|---|---|
| 2,934,900 | A * | 5/1960 | Robinson | 417/394 |
| 3,194,207 | A * | 7/1965 | Dunne | A01K 79/02 116/27 |
| 3,428,940 | A * | 2/1969 | Huckabay | G10K 9/06 367/147 |
| 4,131,178 | A * | 12/1978 | Bouyoucos | G01V 1/133 181/118 |
| 4,691,803 | A * | 9/1987 | Martin | F41F 1/00 181/113 |
| 4,697,588 | A * | 10/1987 | Reichenberger | G10K 11/28 601/4 |
| 4,733,382 | A | 3/1988 | Pascouet | |
| 4,901,709 | A | 2/1990 | Rattner | |

(Continued)

FOREIGN PATENT DOCUMENTS

| | | |
|---|---|---|
| EP | 0189333 A2 | 7/1986 |
| GB | 2399885 A | 9/2004 |
| GB | 2514484 A | 11/2014 |

OTHER PUBLICATIONS

Search Report dated Aug. 12, 2015; The Netherlands Application No. 2013968.

*Primary Examiner* — Isam A Alsomiri
*Assistant Examiner* — Amie M Ndure
(74) *Attorney, Agent, or Firm* — Polsinelli PC

(57) ABSTRACT

Disclosed is a pressure tolerant seismic source for deep water survey. The seismic source can include an electromagnetic coil for generating an electromagnetic pulse, a piston plate movable by said electromagnetic pulse, and a housing with a first chamber and a second chamber separated by each other via a common bulkhead arrangement. The seismic source can also include that the coil is arranged within the first chamber and the piston plate arranged within the second chamber. The seismic source can also include the second chamber is at least partly filled with a liquid coupled to the plate so that due to movement of the plate at least one pressure pulse is generated traveling through the liquid within said second chamber.

18 Claims, 1 Drawing Sheet

(56) References Cited

U.S. PATENT DOCUMENTS

| | | | | |
|---|---|---|---|---|
| 5,144,596 A * | 9/1992 | Pascouet | ............... | G01V 1/137 |
| | | | | 181/120 |
| 7,359,282 B2 * | 4/2008 | Tulett | ................... | G01V 1/3861 |
| | | | | 181/110 |
| 2006/0021609 A1 * | 2/2006 | Jensen | .................... | F41B 11/00 |
| | | | | 124/56 |
| 2010/0302902 A1 * | 12/2010 | Nance | .................... | G01V 1/133 |
| | | | | 367/21 |
| 2012/0188844 A1 * | 7/2012 | Tiltman | ............... | B29C 39/003 |
| | | | | 367/2 |

* cited by examiner

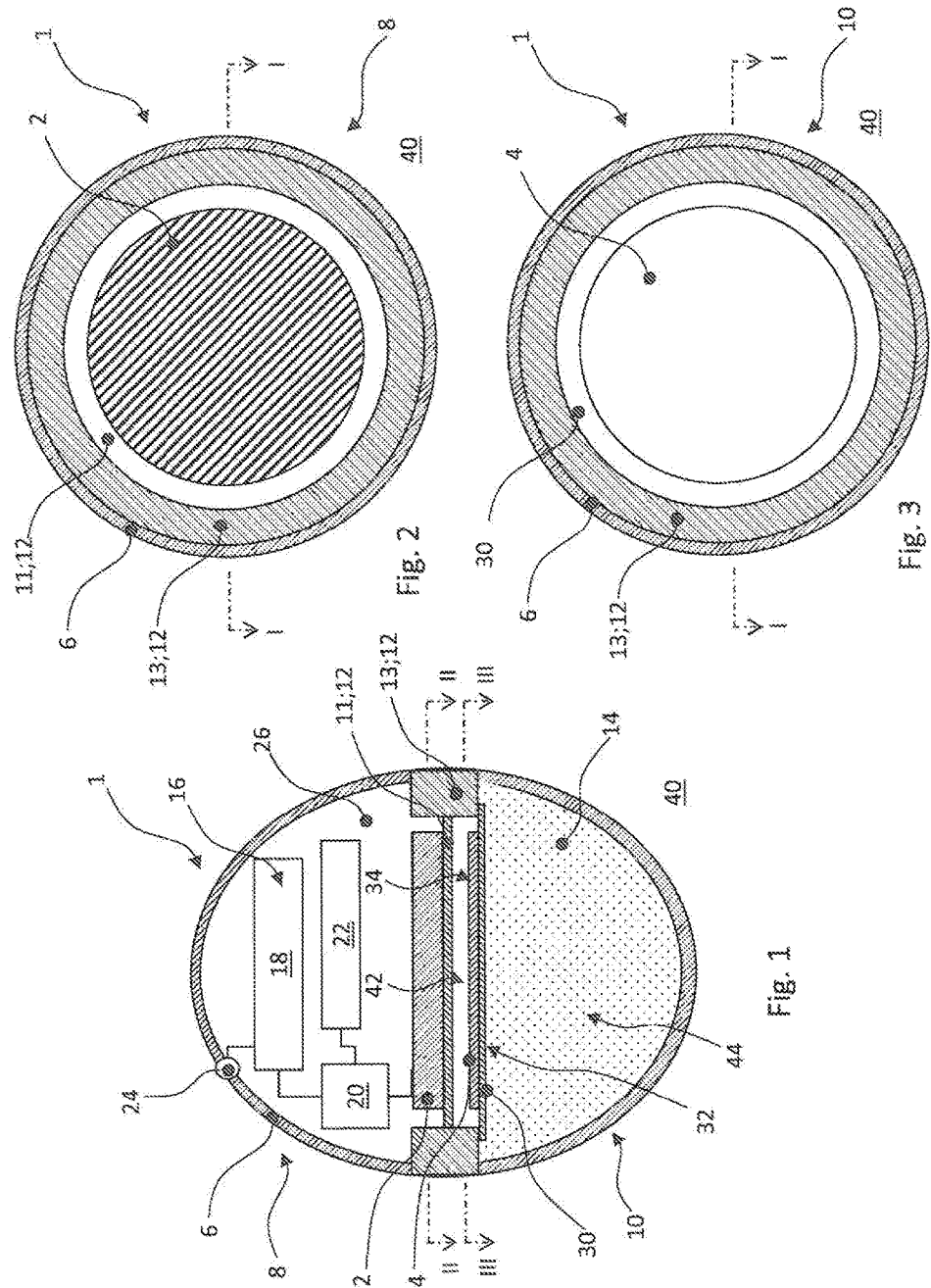

PRESSURE TOLERANT SEISMIC SOURCE

CROSS REFERENCE TO RELATED APPLICATIONS

This application claims priority from Dutch Patent Application No. 2013968, filed Dec. 12, 2014, the contents of which are entirely incorporated by reference herein.

FIELD OF TECHNOLOGY

The present invention relates to a pressure tolerant seismic source preferably for deep water survey comprising an electromagnetic coil for generating an electromagnetic pulse and a piston plate movable by said electromagnetic pulse for generating a pulse of acoustical energy in the water.

The invention more particularly relates to a pressure tolerant seismic source and an audio generator respectively capable of being submerged to great depths while producing a high reproducible pulse of acoustical energy in the water.

BACKGROUND

Such seismic sources and audio generators respectively for deep water survey have been known and are used extensively e.g. to determine the profile of the sub-bottom terrain in underwater surveying. The present invention is concerned with an improved underwater seismic source of the kind which employs a piston plate which is moved and preferably repelled outwardly by an electromagnetic pulse produced by an electromagnetic coil. Optionally, the electromagnetic coil is driven in such a way that eddy currents are induced in the plate resulting in opposing electromagnetic fields moving the plate away from the coil and producing a pressure pulse in the water. The echoes produced by this pulse are then recorded e.g. by a hydrophone and electronic recorder. The pattern and variation in the echoes can be used to assess the strength and stratification of the underlying seabed. For marine seismic surveys (at sea, on rivers and on lakes), such acoustic pulses are generated under water resulting in seismic signals traveling down through the seabed and being reflected before the echoes are recorded.

In deep water surveying and exploration, when operating e.g. at depths in excess of 3,000 meters, the hydrostatic pressure is very high. Seismic sources (transmitter) operating at these depths are exposed to pressure of around 300 bar. Due to the high hydrostatic pressure, low frequency acoustic energy is difficult to generate by conventional methods. Specifically, there is a poor generation of low frequencies from the seismic source into the water. However, such low frequencies provide improved penetration in certain types of geology of the sea bottom. Therefore, these frequencies are necessary to provide the desired geological information.

A seismic source for deep water survey is e.g. disclosed in U.S. Pat. No. 3,993,973 comprising a structure having a coil and a piston plate arranged within a housing of a seismic source. By energizing the coil the plate can be repelled producing an acoustic signal. The coil and plate are arranged in such a way that as the device is raised or lowered in depth in the water, the ambient pressures on the front and rear faces of the plate would vary identically, resulting in the pressure pulse produced by the plate remaining constant over varying depths of submergence of the device. Nevertheless, the disclosed seismic source has a maximum operating depth, which occurs when a rear diaphragm enclosing a gas space is pressed against a fillet. Any further increase in depth will result in a change in the ambient pressure between the front and rear faces of the piston, and undesirable changes to the acoustic pulse signature.

A similar embodiment is disclosed by U.S. Pat. No. 4,875,199 also suffering from negative pressure influences acting on the seismic source over various water depths. U.S. Pat. No. 4,875,199 propose a deep water transient sound generator trying to overcome the deficiencies of U.S. Pat. No. 3,993,973, and in detail trying to eliminate the pressure differences between a front face and a rear face of the piston plate. In use, the piston plate according to U.S. Pat. No. 4,875,199 is driven out into the surrounding water creating the desired acoustical pulse, however, still suffering from signal losses in low frequency ranges, namely 400 to 2,000 Hz.

It is therefore an object of the present invention to provide a depth-independent seismic source that has improved transfer of low frequency acoustic energy into the surrounding marine environment independent of a variety of water depths and especially deep water depths over 500 m the source is operated.

This object is solved by a pressure tolerant seismic source according to claim 1.

SUMMARY OF INVENTION

In detail this object is solved by a pressure tolerant seismic source for deep water survey comprising at least one electromagnetic coil for generating an electromagnetic pulse, at least one piston plate movable by said electromagnetic pulse, and a housing with a first and a second chamber separated by each other via a common bulkhead arrangement, wherein the coil is arranged within the first chamber and the piston plate is arranged within the second chamber, wherein the second chamber is a closed chamber with regard to the outer surrounding environment and at least partly filled with a liquid coupled to the plate so that due to movement of the plate at least one pressure pulse is generated traveling through the liquid within said second chamber.

It is a gist of the invention that the seismic source comprises a housing having at least two chambers, namely a first and a second chamber wherein part of the acoustic means are arranged in a first chamber and the other part separated from the first chamber in a second chamber and wherein the second chamber is a closed chamber with regard to the outer surrounding environment and filled with a liquid so that a pressure pulse emitted within the second chamber directly travels through that liquid and the wall of the second chamber between the second chamber and the outer surrounding environment, generating an acoustic signal emitting from the seismic source without or with reduced losses and independent of water depths, when the seismic source is energized.

Due to the arrangement of the plate directly coupled to the liquid, losses of the generated pulse are reduced. By interfacing first with the liquid of the second chamber, then interfacing with the wall of the second chamber and then interfacing with the surrounding environment, the pressure wave produced in the surrounding environment is improved. Specifically, attenuation of the low frequencies is minimised.

In use, a high voltage power supply or similar power supply energizes the electromagnetic coil, preferably via an energy storage device to a high potential difference, which is typically about 4,000 to 6,000 V. When the storage device is discharged, a large amount of current surges through the coil inducing an opposing current in the piston plate causing the plate to move away from the coil; the piston is repelled by the coil. This movement directly enters into the liquid of the second chamber. The energy propagates through the liquid of the second chamber as a pressure wave. As the second chamber is a closed chamber it then propagates through the wall parts of the second chamber into the liquid of outer surrounding environment. At the interface between the liquid filled second chamber and the surrounding environment very little signal loss occurs in the frequency range of interest, such as 400 Hz to 2,000 Hz.

It has to be mentioned that the above arrangement also covers acoustic sources having at least one plate being arranged in similar but not identical way as long as the plate is arranged in the second chamber and a respective energizer or exciter, called coil, is arranged in the first chamber. In the light of the invention the mentioned electromagnetic coil can be any electromagnetic exciter for generating an electromagnetic pulse for moving and especially repelling a piston plate. With regard to the piston plate, such a plate can be any responder element movable by an electromagnetic pulse and provided for producing a pressure pulse within the liquid of the second chamber. Therefore, the present invention covers with the wording "coil" and "plate" not only traditional piston plate coil sound generators, but also any kind of sound generators based on electromagnetic impulse.

Optionally the first chamber and/or the second chamber comprise at least part of electronic components for driving the coil, like a high voltage power supply, a high voltage power switch, an energy storage device or any other device necessary for energizing the coil and repelling the plate.

Alternatively, the electronics components or parts thereof may be located outside of the housing and especially outside of the first chamber and connected to the coil via a connector arrangement provided on the housing.

Optionally and especially in this regard the housing comprises an electric connector arrangement for connecting the seismic source with a command platform directly or indirectly.

Optionally the housing is provided with an electric connector arrangement for powering the source. Typically, the electronics inside the pressure vessel are powered via an external 24 V DC source from, for example, an AUV. Additionally, control signals to the acoustic source and status signals from the acoustic source may interface with a controller, for example provided on the AUV or any additional command platform, via an additional electric connector arrangement. Control signals and similar signals can also be provided via wireless communication and especially radio signals.

Optionally the first chamber is filled with a gas and optionally with dry nitrogen or a similar moist purging gas. The gas helps to purge moisture from the first chamber, which moisture may cause corrosion of the electronics over time. Optionally the first chamber has an inner pressure around atmospheric pressure.

Optionally the housing is a pressure vessel suitable for operation of a range of varying water depths and especially in deep water depths and optionally in water depths up to 6,000 m. Deep water is optionally understood to mean depths in a range of 500 m to 6,000 m or incremental depth ranges. Therefore the pressure vessel should optionally be able to withstand pressures common at least for depths between 500 m and 6,000 m.

Especially for that reason the housing optionally has a spherical, egg or similar round shape. These shapes are well suited for withstanding high external pressures.

Especially the housing is divided in at least two parts and optionally shell elements interconnected with each other via a respective sealing arrangement, wherein the sealing arrangement is optionally provided with the bulkhead arrangement. Such sealing arrangement for interconnecting housing elements for providing a pressure vessel or similar housing are known from the art. The bulkhead arrangement is optionally attached to that sealing arrangement.

The housing is optionally produced from titanium or a similar pressure resistant material. In general, this means that the interior of the housing and the pressure vessel respectively is divided into a first chamber and a second chamber by the non-metallic bulkhead, wherein optionally the pressure vessel is formed from two portions and especially shell elements that substantially correspond to the two chambers. The two chambers are then connected by a respective sealing arrangement which may be part of the bulkhead arrangement.

With regard to the liquid provided within the second chamber it optionally holds that the liquid has an acoustic impedance for reducing transmission losses. Such a liquid can e.g. be kerosene or a fluid with appropriate acoustic and physical properties. Optionally the liquid of the second chamber is a different liquid than the liquid, e.g. the sea water, in the outer surrounding environment.

Optionally the second chamber has an inner pressure close to atmospheric pressure and optionally in-between 0 bar and 3 bar, more optionally in-between 0 bar and 2 bar.

Optionally it holds that the bulkhead is a non-metallic bulkhead. In another embodiment the bulkhead optionally comprises a flexible membrane optionally arranged between the coil and the plate. This flexible optionally non-metallic membrane helps to protect the plate in use and is optionally arranged between the coil and the piston plate. The membrane may be a continuation of the bulkhead. Also covered from this expression is an arrangement where the membrane is provided as at least on annular or similar ring element providing flexible portions within the bulkhead. In general, the bulkhead can comprise at least partially flexible portions or similar membrane portions.

Optionally the plate is provided with at least one elastic force element and optionally with a diaphragm elastically supporting the plate in an initial position. This elastic force element guarantees the positioning of the plate and its ability to be moved and optionally repelled by the electromagnetic impulse generated by the coil. Due to the elasticity of the force element, the plate removes to its initial position after energizing the coil.

The elastic force element is optionally coupled to the housing or respective supporting elements within the second and/or the first chamber.

Optionally the plate is arranged within the second chamber in such a way that the electromagnetic pulse forces a front side of the plate in direction of the liquid generating the pressure pulse within that second chamber traveling through the liquid. Optionally and especially in this regard the liquid directly stands against at least part of the front side of the plate and/or at least part of the elastic force element. With other word there is optionally not air gap provided between the plate and the liquid. Nevertheless it is possible to arrange at least a further element between the plate and the liquid e.g. at least on elastic force element, as will be explained in the following.

Optionally the elastic force element is at least partly separating the second chamber in a liquid chamber and a gas chamber, the gas chamber being arranged between the liquid chamber and the first chamber. Especially for that reason optionally the elastic force element is a seal element providing at least partly a sealing wall within the second chamber between the liquid chamber and the gas chamber. The gas chamber can be filled with a similar gas as the first chamber and especially dry nitrogen or a similar moist purging gas. Also normal air can be provided in the gas chamber or any other fluid optionally having different abilities than the liquid provided in the liquid chamber.

It is possible to arrange the plate bonded to the elastic force element and especially bonded with its first face, which is facing the liquid chamber, against the elastic force element. When the plate is repelled by the coil, the plate is pressed against the elastic force element transferring a pressure wave through the force element into the adjacent liquid.

When the plate is arranged in such a way that its second face is directed to the gas chamber, repelling the plate by the coil results in under pressure within the gas chamber during the movement of the plate which helps removing the plate into its initial position more effectively. Therefore the gas chamber and the plate are optionally arranged in such a way that movement of the plate due to the electric pulse of the coil generates an under pressure within the gas chamber for removing the plate into its initial position after generating a pressure wave. In general the electric force element is optionally arranged in such a way that it pretentions the plate in its initial position so that after repelling of the plate the same is drawn back into initial position.

Further embodiments of the invention can be taken from the subclaims.

BRIEF DESCRIPTION OF THE DRAWINGS

The afore-mentioned and other features and advantages of the invention will be more fully understood from the following detailed description of an embodiment of the invention, taken together with the accompanying drawings, which are meant to illustrate and not to limit the invention.

In the figures:

FIG. 1 shows a cross-section of one embodiment of the pressure tolerant seismic source according to the invention;

FIG. 2 shows a cross-section of the embodiment of FIG. 1 as indicated therein; and FIG. 3 shows another cross-section of the embodiment of FIG. 1 as indicated therein.

DETAILED DESCRIPTION

In the following for identical parts same reference signs are used, wherein high indices might be set.

FIGS. 1 to 3 disclose one embodiment of a pressure tolerant seismic source and acoustic generator respectively according to the invention.

The seismic source comprises a housing 6 in which housing an electromagnetic coil 2 for generating an electromagnetic pulse and a piston plate 4 movable by said electromagnetic pulse are arranged. As mentioned in the introductory part, such a coil and such a piston plate can be provided as any kind of exciter/responder arrangement for generating an electromagnetic or pressure pulse as necessary for under water survey.

The housing 6 of the seismic source comprises multiple and optionally two shell elements for providing a first chamber 8 and a second chamber 10 separated by each other via a common bulkhead arrangement 12. In this particular embodiment the housing 6 and the respective chambers 10, 12 are formed by eggshell-shaped or similar round housing elements interconnected with each other via a sealing arrangement 13 which is part of the bulkhead arrangement 12. This sealing arrangement can be provided as any sealing arrangement known for deep water usage. The bulkhead arrangement 12 comprises a centre part 11 connected to that sealing arrangement and is provided fluidproof separating the volume of the first chamber 8 from the volume of the second chamber 10.

The coil 2 is arranged within the first chamber 8 and the piston plate 4 arranged within the second chamber 10. The second chamber 10 is further at least partially filled with a liquid 14 which is coupled to the plate 4 in such a way that due to movement of the plate 4 at least one pressure pulse is generated traveling through the liquid within said second chamber 10. The second chamber is a closed chamber with regard to the outer surrounding environment.

For activating the coil 2, electronic components 16 are provided and with this particular embodiment preferable a high voltage power supply 18, a high voltage power switch 20 and an energy storage device 22. These electronic components 16 are connectable via a command platform or similar vessel or means via an electric connector arrangement 24 arranged on the outside of the housing 6. Of course it is possible to also provide at least part of the electronic components 16 outside of the housing 6.

For preventing the electronic components 16 from corrosion, the first chamber 8 is optionally filled with gas and especially dry nitrogen or a similar moist purging gas. The pressure within the first chamber 8 is thereby optionally arranged around atmospheric pressure.

As can be seen from the figures, the housing comprising the multiple housing parts forming the first and second chambers has a spherical, egg or similar round shape, as this shape withstands high pressure loads provided in higher depths to a reliable degree. As the seismic source is arranged for deep water survey, the housing is optionally provided as a pressure vessel suitable for operation of a range of varying water depths and optionally in deep water depths and more optionally in water depths of up to 6,000 m. A preferable material for reducing such a housing is titanium or a similar resistant and with regard to the energizing of the plate via electromagnetic pulses.

After energizing the coil 2 via the power optionally stored in the energy storage, an electromagnetic field induced into the plate 4 repels the plate from the coil 2 in such a way that a front surface 32 of the plate 4 induces a pressure wave into the liquid 14. This pressure wave propagates through the liquid of the closed second chamber, through the wall of the second chamber between the second chamber and the environment, and further propagates through the outer surrounding environment 40. At the interface between the liquid filled second chamber 10 and the surrounding environment 40 very little signal loss occurs in the frequency range of interest which is optionally 400 Hz to 2,000 Hz.

By interfacing first with the liquid 14 of the second chamber 10 and then interfacing with the surrounding environment 40, the pressure wave produced in the surrounding environment is improved and the influences of varying water depths are minimized. Specifically, attenuation of low frequencies is prevented.

Providing the liquid 14 in such a way that it has acoustic impedance for reducing transmission losses improves this effect. Especially in this regard the liquid optionally is kerosene or a fluid with appropriate acoustic and physical properties.

Of further advantage is when the closed second chamber 10 has an inner pressure close to atmospheric pressure and optionally in-between 0 bar and 3 bar, more optionally in-between 0 bar and 2 bar.

The bulkhead arrangement 12 separating the first chamber 8 from the second chamber 10 is optionally primarily a non-metallic bulkhead arrangement.

As can be seen especially with FIG. 1, the plate 4 is optionally provided with an elastic force element 30, and optionally a diaphragm elastically supporting the plate 4 in an initial position as shown with FIG. 1. Due to this elastic force element 30 the plate 4 can be moved relative to the liquid 14 and the coil 2 due to the electromagnetic pulses induced by the coil 2.

As can be further seen with FIG. 1, optionally the elastic force element 30 is at least partly separating the second chamber 10 in a liquid chamber 44 and a gas chamber 42, the gas chamber 42 being arranged between the liquid chamber 44 and the first chamber 8. That means that within the gas chamber 42 preferably no liquid is provided or at least no liquid having the same abilities than the one of the liquid chamber 44.

Optionally for such an arrangement the elastic force element 30 is a seal element and especially a sealing diaphragm providing at least partly a sealing wall within the second chamber 10 between the liquid chamber 44 and the gas chamber 42.

As can be seen with FIG. 1, the plate 4 is arranged within the second chamber 10 in such a way that the electromagnetic pulse forces a front side 32 of the plate 4 in direction of the liquid 14 generating the pressure pulse within that second chamber 10 propagating through the liquid 14. Independent of other arrangements, the plate 4 is optionally bonded or similarly arranged to the elastic force element 30 on the side of the gas chamber 42, therefore standing not in direct contact with the liquid 14.

The back side 34 of the plate 4 optionally faces in direction of the gas chamber 42 and the coil 2 respectively.

In the foregoing specification, the invention has been described with reference to a specific embodiment of the invention. It will, however, be evident that various modifications and changes may be made therein without departing from the broader spirit and scope of the invention as set forth in the appended claims. It has to be mentioned that all the features mentioned and especially the features mentioned in the claims could be provided with an embodiment of the invention in combination or on their own. The combination of features as brought forward with the above embodiments is not necessarily required.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

LIST OF REFERENCE SIGNS

1 Pressure tolerant seismic source
2 Electromagnetic coil
3 Piston plate
6 Housing
8 First chamber
10 Second chamber
11 Centre part
12 Bulkhead arrangement
13 Sealing arrangement
14 Liquid
16 Electronic components
18 High voltage power supply
20 High voltage power switch
22 Energy storage device
24 Electric connector arrangement
26 Gas
30 Elastic force element and diaphragm respectively
32 Front side
34 Back side
40 Surrounding environment
42 Gas chamber
44 Liquid chamber

What is claimed:

1. A pressure tolerant seismic source for deep water survey comprising:
   at least one electromagnetic coil for generating an electromagnetic pulse;
   at least one piston plate movable by the electromagnetic pulse; and
   a housing with a first chamber and a second chamber separated by each other via a common bulkhead arrangement,
   wherein the coil is arranged within the first chamber and the piston plate is arranged within the second chamber,
   wherein the second chamber is a closed chamber with regard to the outer surrounding environment at least partly filled with a liquid coupled to the plate so that due to movement of the plate at least one pressure pulse is generated traveling through the liquid within the second chamber and a wall of the second chamber between the second chamber and the outer surrounding environment to generate an acoustic signal.

2. The seismic source according to claim 1, wherein the first chamber comprises at least part of electronic components for driving the coil, like a high voltage power supply, a high voltage power switch, an energy storage device connected with each other.

3. The seismic source according to claim 1, wherein the housing comprises electric connectors for connecting the seismic source with a command platform.

4. The seismic source according to claim 1, wherein the first chamber is filled with a gas and optionally dry nitrogen or a similar moist purging gas.

5. The seismic source according to claim 1, wherein the first chamber has an inner pressure around atmospheric pressure.

6. The seismic source according to claim 1, wherein the housing is a pressure vessel suitable for operation over a range of varying water depths and in deep water depths and optionally in water depths of up to 6000 m.

7. The seismic source according to claim 1, wherein the housing has a spherical, egg or similar round shape.

8. The seismic source according to claim 1, wherein the housing is produced from titanium or a similar resistant material.

9. The seismic source according to claim 1, wherein the liquid has an acoustic impedance for reducing transmission losses.

10. The seismic source according to claim 1, wherein, the liquid is kerosene or a fluid with appropriate acoustic and physical properties.

11. The seismic source according to claim 1, wherein the second chamber has an inner pressure close to atmospheric pressure and optionally in between 0 bar and 3 bar, more optionally in between 0 bar and 2 bar.

12. The seismic source according to claim 1, wherein the bulkhead arrangement is primarily a non-metallic bulkhead arrangement.

13. The seismic source according to claim 1, wherein the bulkhead arrangement is arranged between the coil and the plate.

14. The seismic source according to claim 1, wherein the plate is provided with at least one elastic force element and optionally a diaphragm elastically supporting the plate in an initial position.

15. The seismic source according to claim 14, wherein the plate is arranged within the second chamber in such a way that the electromagnetic pulse forces a front side of the plate in direction of the liquid generating the pressure pulse within said second chamber traveling through the liquid.

16. The seismic source according to claim 15, wherein the elastic force element is at least partly separating the second chamber in a liquid chamber and a gas chamber, the gas chamber being arranged between the liquid chamber and the first chamber.

17. The seismic source according to claim 16, wherein the elastic force element is a seal element providing at least partly a sealing wall within the second chamber between the liquid chamber and the gas chamber.

18. The seismic source according to claim 17, wherein the plate is arranged at and optionally bonded with the elastic force element optionally within the gas chamber.

* * * * *